United States Patent Office

2,898,372
Patented Aug. 4, 1959

2,898,372
MOLD INHIBITING PROCESS AND PRODUCT

Arnold T. Anderson, Lewiston, N.Y.

No Drawing. Application March 14, 1958
Serial No. 721,343

1 Claim. (Cl. 260—540)

This invention relates to new compositions of matter and to a process for making them. More particularly, the present invention relates to calcium acetate propionate and mixtures containing the same, as new compositions of matter which are particularly useful as mold inhibitors in bread, and to a process for making these materials.

Calcium acetate propionate (for convenience, also referred to herein as CAP) is a neutral salt which, when in the anhydrous state, may be represented by the formula:

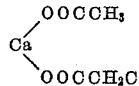

Calcium acetate propionate is useful as a mold inhibitor. When used for this purpose either alone or in admixture with calcium dipropionate and/or calcium diacetate, it is outstanding and unexpectedly superior to the known materials. This novel mixed salt possesses a combination of properties which has heretofore been unobtainable using the commercially available mold inhibitors.

Calcium acetate propionate can be prepared by reacting, in aqueous solution, a mixture of acetic acid and propionic acid with a source of calcium ions.

The calcium ions may be obtained by using calcium hydroxide, calcium oxide, calcium carbonate, calcium metal, or other similar source of calcium. Calcium hydroxide is preferred because of its inexpensiveness, its safeness, and because of the fact that no foaming problems are created by its use.

The reaction may be conducted at a temperature of from about 15° C. to about 100° C., but is preferably conducted at room temperature. The pH of the reaction mixture may vary between 6.5 and 8.5 but is preferably about 7–7.5.

To obtain maximum yields of calcium acetate propionate, the acetic acid and propionic acid should be employed in substantially equimolar amounts. However, the acetic acid:propionic acid ratio may vary between 1:9 and 8:2.

The calcium ion should be present in from 0.8 to 1.2 mol proportions, based on the total number of mols of acids used.

If completely pure reactants are utilized, no additional materials need be present during the reaction. If the reactants are not pure, activated carbon and/or filter cell (a filter aid prepared from diatomaceous earth) are preferably present.

Preferably, sufficient water is added to the action mixture to dissolve all of the calcium acetate propionate formed during the reaction.

After the reaction is complete, the mixture can be cooled to from 0° C. to 25° C. and preferably to about 15° C. The cooling step is important, in that it increases the solubility of the product and eliminates crystallizing difficulties which might occur due to excessive solvent evaporation.

After cooling, the reaction mixture can be filtered to remove any activated carbon or filter cell present.

After filtration, from about 2 to 5 percent, and preferably about 3 percent, based on the total acids originally added, of acetic acid and propionic acid in the same molecular ratio may be added to the filtrate. This is preferably done to minimize possible hydrolysis of the calcium acetate propionate product.

Following the addition of the additional quantity of acids, if any, the filtrate can then be dried. The calcium acetate propionate can be spray dried or can be recovered from the filtrate by means of crystallization or by precipitation by a common ion effect. However, spray drying is preferred.

The following examples are illustrative of the present invention:

EXAMPLE I

One pound fourteen ounces of calcium oxide was mixed carefully with thirteen pounds two ounces of water and the resulting slurry was transferred to a Hobart mixer. A mixture of one pound twelve ounces of acetic acid and two pounds three ounces of propionic acid was added slowly to the lime slurry in the mixer. The resulting mixture was then heated to a temperature of 99° C. Four ounces of activated charcoal were added to the mixture, which was then stirred for about 10 minutes. The resulting mixture was then filtered through a paper filter to a small carboy, wherein the filtrate was adjusted to a pH of 7 using a mixture of acetic acid and propionic acid in the same mol ratio as employed in the original charge. Three percent excess acid was then added. The slightly acid filtrate was then spray dried in a Bowen laboratory spray drier. The dry product was identified by means of infra-red spectra and X-ray diffraction patterns as calcium acetate propionate. The patterns for this material were distinctive and exhibited marked differences when compared with a physical mixture containing comparable amounts of calcium diacetate and calcium dipropionate.

EXAMPLE II

Water (4697 grams) was charged to a 3-gallon stainless steel reactor which was fitted with a large air-driven stirrer. Hydrated lime (628.4 grams) was added slowly, with stirring, to form a slurry. A mixture of 96.1 grams of acetic acid and 1066.7 grams of propionic acid was then added slowly to the lime slurry. After the addition of the acid mixture, the pH of the resulting mixture was found to be 5. Additional lime was added to bring the pH to 7. Filter cell (14 grams) and activated carbon (14 grams) were added to the reaction mixture, which was then filtered and the filtrate spray dried at an outlet temperatpre of 70° C. Infra-red spectra and X-ray diffraction patterns of the product verified the presence of a substantial amount of the true mixed salt, calcium acetate propionate, as well as some calcium diacetate and some calcium dipropionate.

EXAMPLE III

Water (4697 grams) was charged to a 3-gallon stainless steel reactor which was fitted with a large air-driven stirrer. Hydrated lime (628.4 grams) was added slowly, with stirring, to form a slurry. A mixture of 118.5 grams of acetic acid and 864.7 grams of propionic acid was then added slowly to the lime slurry. The reaction mixture was then brought to a pH of 7 by the addition of acetic acid and propionic acid in the same mol ratio as employed in the original charge. The reaction mixture was then filtered and the filtrate spray dried at a temperature of 70° C. Infra-red spectra and X-ray diffraction patterns of the product verified the presence of a substantial amount of calcium acetate propionate, as well as some calcium diacetate and some calcium dipropionate.

The production and marketing of bakery products, and bread in particular, is marked by a number of problems. One of the more difficult to overcome is that of spoilage which may be due either to the growth of mold on the surface of or in the interior of the bakery product, or by the formation of ropiness caused by the growth of micro-organisms from the *Bacillus mesentericus* group, for example *Bacillus mesentericus vulgatus*. Mold spores are generally present as a result of contamination of the product after it has been prepared and are unavoidable in the usual handling procedures. The micro-organisms causing ropiness, on the other hand, are often found in the ingredients of bakery products and are not destroyed by baking temperatures.

There are presently on the market two general types of materials which, when added to baked goods and other food products, substantially retard the rate at which the above-described undesirable spoilage takes place. The first of these is sodium diacetate, a non-toxic water-soluble acetate salt containing combined but undissociated acetic acid. This material is fairly effective in retarding the growth of mold and rope-forming bacteria in bread and other bakery products. At the level generally employed, it is substantially tasteless and does not adversely affect the performance of the sponge or dough during the customary processes of bread making. In fact, the use of the material provides several substantial advantages in the preparation of bread in addition to the prevention of spoilage.

Sodium diacetate has the disadvantage, however, of a rather limited range of usefulness. The rate at which spoilage is retarded increases gradually to a certain point with increasing amounts of additive. However, above the level of about 6 ounces of sodium diacetate per 100 pounds of flour, no additional benefit is obtained by adding increasing amounts of the material. In some sections of the country where molding of bakery products is more of a problem than in other sections, it is desirable that the measure of protection afforded by a mold inhibiting additive be increased above that obtained by the aforementioned 6 ounces of sodium diacetate per 100 pounds of flour.

A second type of spoilage inhibitor presently available is a salt of a saturated aliphatic monocarboxylic acid of from 3 to 12 carbon atoms. The compounds of this class which are sold commercially at the present time and which are apparently the most advantageous are sodium propionate and calcium propionate. These materials are non-toxic and possess the advantage that the degree of protection afforded by them increases as the amount of material added to the bakery product is increased, making possible the realization of any degree of protection desired.

The sodium and calcium propionates have the severe disadvantage, however, that they impart off-flavors and odors to the bakery products. These off-flavors and odors may be described as cheese-like and are considered extremely undesirable. These off-flavors and odors are particularly noticeable in the toasting of bread which is several days old.

Calcium acetate propionate overcomes substantially all of the disadvantages of the presently known mold inhibitors. It may be used in bread and other bakery products over a wide range of concentrations in order to provide the desired degree of protection against molding and other spoilage caused by micro-organisms. In addition to providing the necessary degree of protection, calcium acetate propionate possesses the additional property of producing no odor or off-flavor in the bakery products to which it is added. It has been found that the addition of calcium acetate propionate to the dough supplied in the preparation of bread, cake, rolls, biscuits and other bakery products in amounts sufficient to inhibit the formation of mold and the development of other undesirable micro-organisms provides a bakery product which has superior keeping qualities and which, at the same time, does not possess an undesirable off-flavor or odor due to the addition of mold inhibitor.

Calcium acetate propionate can be used alone, as the pure mixed salt, either anhydrous or containing water of hydration, or in admixture with calcium diacetate and/or calcium dipropionate. The composition of the admixture may be varied by changing the molar ratio of acetic to propionic acids in the reaction mixture. For the sake of convenience, the mixtures containing calcium acetate propionate (and calcium diacetate and/or calcium dipropionate) will be described through the specification as having a particular molar ratio and this molar ratio will be given numerically, the figure for acetic acid appearing first. For example, calcium acetate propionate 25–75 indicates a mixture containing calcium acetate propionate and prepared using the two acid constituents in the ratio of 25 moles of acetic acid to 75 moles of propionic acid, and that calcium is combined with the two acids in the usual amount.

While the calcium acetate propionate containing mixtures can be prepared in any molar ratio desired, the molar ratios which have been found most useful according to this invention range from 10–90 to 80–20. Where the calcium acetate propionate mixtures are prepared using a proportion of propionic acid above this range, their use at an effective level imparts most of the undesirable off-flavors and odors of propionic acid and is therefore to be avoided. Where the material is prepared using an amount of propionic acid below the range indicated above, the material is not sufficiently effective in inhibiting the development of undesirable micro-organisms.

The results obtained by employing calcium acetate propionate are much greater than that obtained from the use of either calcium acetate or calcium propionate alone or by using a physical mixture of calcium acetate and calcium propionate. Calcium and sodium acetate have not, by themselves, been found to be of value as mold inhibitors. The sodium diacetate described above is effective as a mold inhibitor because of the undissociated acetic acid content thereof.

It has been found, surprisingly enough, that the acetate portion of the calcium acetate propionate contributes significantly to the mold inhibiting properties of the compositions. For example, calcium acetate propionate 25–75 at a level of 4.5 ounces per 100 pounds of flour was found to be superior in mold inhibiting properties to 3.5 ounces of calcium propionate. The calcium acetate propionate at this molar ratio (25–75) is prepared from about 3.4 ounces of calcium propionate. In addition, while the calcium acetate propionate imparted a slight odor and flavor to the bread, the odor was not considered unpleasant and was not as undesirable as the distinct cheese-like off-flavor and odor imparted by calcium propionate at a 3.5 ounce per 100 pounds of flour level.

Thus, for reasons not fully understood, the calcium acetate propionate is a more effective mold inhibitor than calcium propionate in an equivalent amount. In addition, the presence of the acetate ion reduces in some manner the off-flavor and odor level usually imparted by the propionate ion.

The level at which the calcium acetate propionate of this invention is employed will depend, to some extent, upon the susceptibility of bakery products in a particular geographical area to microbiological spoilage and upon the type of bakery product in which the inhibitor is employed. In addition, the molar ratio of calcium acetate propionate must be taken into account. For example, in metropolitan New York, which has an average problem with regard to the development of mold and other spoilage micro-organisms in bread, the preferred level of calcium acetate propionate 25–75 is 4.5 ounces per 100 pounds of flour.

The following experiments demonstrate the effectiveness of calcium acetate propionate, or mixtures containing calcium acetate propionate, as mold inhibitors.

Experiment I

A series of batches of soft rolls were prepared. Some of the batches contained mixtures containing calcium acetate propionate prepared by reacting the acids at various molar ratios and at various levels. Other batches were prepared containing both sodium diacetate and calcium propionate. Representative portions of each batch were stored under identical conditions and the mold-inhibiting properties of each additive were compared after suitable periods of time. The soft rolls were prepared according to a conventional sponge-dough method. Each portion of each bath had the following formula:

Sponge:
    Ingredient—                                Amount
        Flour _____pounds__ 300
        Water _____do____ 180
        Yeast _____do____ 4.8
        Arkady (a yeast food) _____do____ 2.0
        Enriched "B" tablets (vit. B) _____ 4—
        Shortening _____pounds__ 22.8
        Emulsified shortening _____do____ 4.0
        Amylase, tablets _____ 8—
        Salt _____pounds__ 1.4
Dough:
    Ingredient—
        Clear flour _____do____ 150
        Water _____do____ 115
        Salt _____do____ 9
        Cane sugar _____do____ 45
        Inhibitor _____ (As designated below)

The soft roll dough batches were prepared in accordance with normal plant procedures. Sponge fermentation required 5–6 hours to reach peak maturity at 72° F. and 78-80 percent relative humidity. Each period of dough mixing in a Baker Perkins mixer required 7½ minutes.

After sponge-dough mixing, the batch was divided, rounded and molded, using A.M.F. equipment. Proofing required 60–75 minutes in an F.D.P. fenning box at 90 percent humidity. Baking required 10 minutes at 425° F. in a Peterson double unit oven. Examination for flavor, odor and taste characteristics was performed while the rolls were still hot from the oven. The baked rolls were cooled, sliced and wrapped.

A minimum of six dozen hamburger buns of each inhibitor at each level were packed in cellophane bags and heat sealed. These were then placed in storage under two separate conditions. These storage conditions were as follows: (1) room prevailing temperature and humidity, and (2) 72° F. and 50 percent relative humidity.

The following table illustrates the results obtained by comparing the mixtures containing calcium acetate propionate (C.A.P.) with calcium propionate. A batch containing 4.5 ounces of calcium acetate propionate (prepared from acids having a molar ratio of 25–75) per 100 pounds of flour was compared with a batch containing 3.5 ounces of calcium propionate per 100 pounds of flour. The figures given indicate the percent of rolls in the specified batch found to have mold after the indicated period of time.

| Days after Baking | Room Temperature and Humidity | | 72° F., 50% R.H. | |
|---|---|---|---|---|
| | C.A.P., Percent | Ca Propionate, Percent | C.A.P., Percent | Ca Propionate, Percent |
| 8 | 0 | 0 | 0 | 0 |
| 11 | 9 | 47 | 5 | 25 |
| 12 | 53 | 90 | 20 | 30 |
| 13 | 76 | 97 | 30 | 35 |
| 14 | 87 | 100 | 30 | 35 |
| 19 | 100 | 100 | 65 | 80 |

It will be noted from the above table that the C.A.P. is substantially more effective under the room temperature storage conditions. The C.A.P. 25–75 at 4.5 ounces per 100 pounds of flour contains an amount of calcium propionate equivalent to 3.4 ounces of calcium propionate per 100 pounds of flour. It is noteworthy that the C.A.P. at the level given provided substantially no off-flavor or odor in the rolls while the calcium propionate imparted a definite off-odor to the baked products.

Experiment II

Following the procedure outlined in Experiment I, a comparison was made between calcium acetate propionate 25–75 and sodium diacetate. The following table shows the results of this comparison. A level of 4.1 ounces of C.A.P. per 100 pounds of flour is compared with a level of 4.4 ounces of sodium diacetate per 100 pounds of flour.

| Days after Baking | Room Temperature and Humidity | | 72° F., 50% R.H. | |
|---|---|---|---|---|
| | C.A.P., Percent | Na diacetate, Percent | C.A.P., Percent | Na diacetate, Percent |
| 7 | 0 | 19 | 0 | 0 |
| 11 | 14 | 85 | 0 | 0 |
| 12 | 28 | 96 | 0 | 0 |
| 13 | 34 | 100 | 0 | 40 |
| 14 | 52 | 100 | 0 | 85 |
| 17 | 55 | 100 | 0 | 100 |

Experiment III

A series of tests were made in which the molar ratio of acetate to propionate in the co-precipitated salt composition was varied. The Quartermaster Corps straight dough method was used in preparing the bread. The mold inhibitors were added dry with the other dry ingredients. The breads were wrapped ½ hour after baking and stored at 80° F. A record was made of the number of days' storage before the first appearance of mold. The following table summarizes the results in terms of the additional number of days the bread remained mold-free over a control containing no mold inhibitor.

| Inhibitor | Ounces per 100 pounds of Flour | Days Protection Over Control |
|---|---|---|
| Sodium diacetate | 4 | 3 |
| O.A.P. 25–75 | 4 | 4 |
| | 6 | 4 |
| | 1 | 3 |
| O.A.P. 10–90 | 4 | 5 |
| | 5 | 7 |
| | 6 | 7 |
| | 1 | 1 |
| Calcium propionate | 4 | 5 |
| | 5 | 5 |
| | 6 | 5 |

Organoleptic examination of these products containing each of the above-listed inhibitors at the 4 ounce level showed that calcium propionate has the strongest off-odor and off-flavor. The C.A.P. 10–90 and C.A.P. 25–75 had considerably less off-odor and flavor than calcium propionate, while the sodium diacetate had no off-odor or taste.

It will be noted from the results described above that C.A.P. 10–90 is actually better on a weight for weight basis than calcium propionate. This is apparently due to a synergistic effect. This, coupled with the fact that the C.A.P. 10–90 develops considerably less off-flavor and odor, strongly demonstrates the advantages to be obtained according to this invention.

Experiment IV

A series of test batches of bread were baked following the Quartermaster Corps straight dough method. One batch contained C.A.P. 25-75 at a level of 4.5 ounces per 100 pounds of flour (3.4 ounces as calcium propionate). A second batch contained calcium propionate at a level of 3.5 ounces per 100 pounds of flour. After baking, one loaf of each batch was cut open before wrapping to observe molding of exposed crumb.

In the uncut loaves, the C.A.P. provided from two to three days of mold-free storage at room temperature and humidity over the calcium propionate. In the cut loaves, the C.A.P. provided from one to two days of additional protection.

The C.A.P. at the level employed gave no discernible off-flavor or odor to the bread.

Experiment V

Nineteen separate straight doughs were prepared on one day, each of these doughs yielding one loaf of bread. One of the doughs contained no inhibitor and was considered the control. Nine of the doughs contained C.A.P. 25-75 at the concentration of 4 ounces per 100 lbs. of flour. The remaining nine doughs contained calcium diacetate and calcium dipropionate at the rates of 1 ounce per 100 lbs. of flour and 3 ounces per 100 lbs. of flour, respectively.

All the doughs were handled in the same manner and, because they were all made on the same day, environmental factors were constant. Each bread was sealed in cellophane one-half hour after baking and all breads were stored together in a cabinet at 86° F. Each bread was examined daily for mold growth and the results of these examinations were as follows:

NUMBER OF BREADS SHOWING MOLD

| Days after baking | 1 | 2 | 3 | 4 | 5 | 6 | 7 | 8 | 9 |
|---|---|---|---|---|---|---|---|---|---|
| Control bread | | | | | 1 | | | | |
| Calcium acetate propionate breads | | | | | | | | 1 | 1 |
| Mixed calcium diacetate, calcium dipropionate breads | | | | | | | | 2 | 5 |

| Days after baking | 10 | 11 | 12 | 13 | 14 | 15 | 16 | 17 | |
|---|---|---|---|---|---|---|---|---|---|
| Control bread | | | | | | | | | |
| Calcium acetate propionate breads | 1 | | | 3 | | 2 | | 1 | |
| Mixed calcium diacetate, calcium dipropionate breads | 2 | | | | | | | | |

It can be seen from the above table that after ten days, all of the mixed calcium diacetate, calcium dipropionate breads had molded; whereas after ten days only one-third of the group of calcium acetate propionate breads had molded. It can be further seen that one-third of the calcium acetate propionate groups actually provided more than 50 percent longer protection than was afforded by the mixture of salts.

It is understood that the foregoing experiments are illustrative only and that modifications will occur to those skilled in the art. Therefore, the invention is not to be limited thereto but is to be defined by the appended claim.

The present application is a continuation-in-part of my copending application, Serial No. 670,880, filed July 10, 1957.

I claim:
Calcium acetate propionate.

References Cited in the file of this patent
UNITED STATES PATENTS

| 1,318,174 | Plaisance | Oct. 7, 1919 |
| 2,190,714 | Hoffman et al. | Feb. 20, 1940 |
| 2,305,826 | Iglauer | Dec. 22, 1942 |
| 2,474,227 | Coleman et al. | June 28, 1949 |